(12) United States Patent
Blum et al.

(10) Patent No.: US 7,456,962 B2
(45) Date of Patent: Nov. 25, 2008

(54) CONICAL REFRACTION POLARIMETER

(75) Inventors: Joel R. Blum, Northglenn, CO (US);
Paul A. Searcy, Golden, CO (US)

(73) Assignee: Meadowlark Optics, Inc., Frederick, CO (US)

( * ) Notice: Subject to any disclaimer, the term of this patent is extended or adjusted under 35 U.S.C. 154(b) by 335 days.

(21) Appl. No.: 11/348,077

(22) Filed: Feb. 6, 2006

(65) Prior Publication Data
US 2006/0193044 A1     Aug. 31, 2006

Related U.S. Application Data

(60) Provisional application No. 60/650,655, filed on Feb. 7, 2005.

(51) Int. Cl.
*G01J 4/00* (2006.01)
(52) U.S. Cl. .................................. 356/367; 356/369
(58) Field of Classification Search ................ 356/367, 356/365, 364
See application file for complete search history.

(56) References Cited

U.S. PATENT DOCUMENTS 4,310,247 A * 1/1982 Korth et al. .................. 356/365
5,237,388 A * 8/1993 Hirano et al. ................ 356/491

FOREIGN PATENT DOCUMENTS

WO     WO 2005/118143 A2 * 12/2005

OTHER PUBLICATIONS

Wallace, Conical Refraction Becomes Practical, Jun. 2004, Laser Focus World.
Mansuripur, External Conical Refraction, Aug. 1997, Optics & Photonics News, pp. 50-52.
Muller, This is the Story of Conical Refraction that was Discovered more than 150 Years Ago and Only Now Will Come to Real First Applications, Jun. 2004, VCT Website.
Muller, Competition for Applications Based on the Effect of Conical Refraction, Aug. 2004, VCT Website.

* cited by examiner

*Primary Examiner*—Roy M Punnoose
(74) *Attorney, Agent, or Firm*—Pritzkau Patent Group, LLC

(57) ABSTRACT

A polarimeter for receiving input electromagnetic radiation characterized by a polarization state and for determining the polarization state. The polarimeter includes a refractive arrangement for refracting the input electromagnetic radiation so as to provide a spatial pattern corresponding to the polarization state, and an image analysis arrangement for receiving the spatial pattern, producing an electronic image of the spatial pattern, and for determining the polarization state of the input electromagnetic radiation according to the electronic image of the spatial pattern.

21 Claims, 12 Drawing Sheets

CONICAL REFRACTION POLARIMETER

RELATED APPLICATION

The present application claims priority from U.S. Provisional Patent Application Ser. No. 60/650,655, filed on Feb. 7, 2005 and is incorporated herein by reference in its entirety.

BACKGROUND OF THE DISCLOSURE

The present application is related generally to polarimeters and, more particularly, to an image based polarimeter system and method.

Upon passing through a conical refractive crystal, a light beam is refracted into a hollow cylinder by internal conical refraction or a hollow cone by external refraction.

This conical refraction effect has been known since 1832 when William Hamilton published a series of papers regarding the theory of internal and external conical refraction and experimentally verified by Humphrey Lloyd shortly thereafter. However, the rarity of a suitable biaxial material in nature has thus far prevented the development of applications of the conical refraction effect. A newly developed material, monoclinic double tungstate (MDT), from Vision Crystal Technology AG is a promising material capable of producing internal conical refraction effect for beam shaping.

The foregoing examples of the related art and limitations related therewith are intended to be illustrative and not exclusive. Other limitations of the related art will become apparent to those of skill in the art upon a reading of the specification and a study of the drawings.

SUMMARY OF THE DISCLOSURE

The following embodiments and aspects thereof are described and illustrated in conjunction with systems, tools and methods which are meant to be exemplary and illustrative, not limiting in scope. In various embodiments, one or more of the above-described limitations have been reduced or eliminated, while other embodiments are directed to other improvements.

As will be disclosed in more detail hereinafter, there is disclosed herein a polarimeter for receiving input electromagnetic radiation characterized by a polarization state and for determining the polarization state. The polarimeter of the present disclosure includes a refractive arrangement for refracting the input electromagnetic radiation so as to provide a spatial pattern corresponding to the polarization state. The polarimeter further includes an image analysis arrangement for receiving the spatial pattern, producing an electronic image of the spatial pattern, and for determining the polarization state of the input electromagnetic radiation according to the spatial pattern.

In another aspect of the disclosure, a method for use in a polarimeter is disclosed. The polarimeter is configured for receiving input electromagnetic radiation characterized by a polarization state and for extracting the polarization state. The method includes refracting the input electromagnetic radiation so as to provide a spatial pattern corresponding to the polarization state, and electronically analyzing the spatial pattern to determine the polarization state.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the disclosure and is provided in the context of a patent application and its requirements. Various modifications to the described embodiments will be readily apparent to those skilled in the art and the generic principles herein may be applied to other embodiments. Thus, the present disclosure is not intended to be limited to the embodiment shown but is to be accorded the widest scope consistent with the principles and features described herein.

Figure 1:
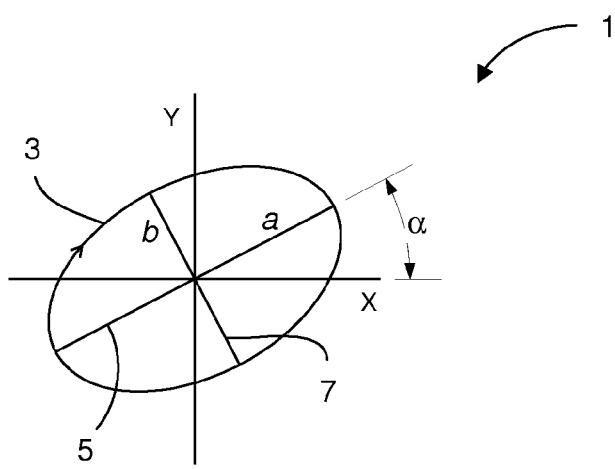
FIG. 1 is a diagram of an exemplary polarization ellipse.

Applicants have recognized that the conical refraction pattern produced by refracting incident radiation using a conical refractive crystal is dependent on the polarization state of the incident radiation. The term incident radiation is understood to refer to any input electromagnetic radiation over a range of wavelengths including, but not limited to, those in infrared, visible and ultraviolet. For instance, Applicants have recognized that linearly polarized light is refracted as an arc whose orientation is determined by the angle of the linear polarization state. Similarly, circularly polarized light is refracted as a ring of equal intensity around the ring in the conical refraction pattern. Elliptically polarized light is refracted as a ring, but with the intensity varying around the ring, which describes the angle of rotation of the ellipticity. A plot 1 showing the various parameters of elliptically polarized light is illustrated in FIG. 1. FIG. 1 shows a polarization ellipse 3 with a semimajor axis 5 and a semiminor axis 7. An angle of rotation $\alpha$ (indicated by a double headed arrow) and an ellipticity of the polarization ellipse $\epsilon$ (defined as $\epsilon=b/a$, where b is the length of semiminor axis 7 and a is the length of semimajor axis 5) are also shown in FIG. 1. Measurements of the conical refraction pattern may be taken by capturing the intensity information of the ring at a variety of spatial locations across the pattern. Such pattern capture may be performed, for example, by using a charge-coupled device (CCD), photo detector array, charge injection device (CID), complementary metal oxide semiconductor (CMOS) or any other suitable electronic imaging device. The captured image information may then be analyzed to extract information regarding the polarization state of the input light. In this way, the effect of conical refraction may be used as the basis of a polarimeter.

Internal or external conical refraction may be used in the context of the present disclosure. Internal conical refraction may be advantageous because a collimated input beam is acceptable. Furthermore, the output beam in internal conical refraction may be expanded with lenses before being incident on an image capture device.

Figure 2:
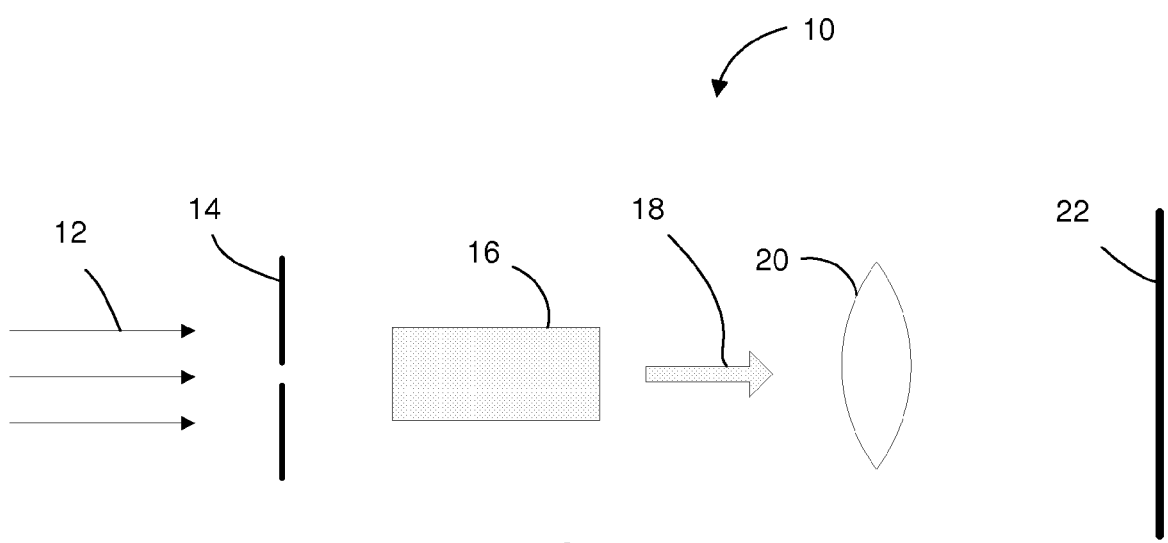
FIG. 2 is a schematic diagram showing an optical setup for viewing a refraction pattern formed by passing light through a conical refractive crystal.

One example of an optical setup for viewing or capturing the conical refraction pattern for a given light input is illustrated in FIG. 2. FIG. 2 shows an optical system 10 for producing the conical refraction pattern for input light 12 (indicated by arrows). Input light 12 is directed through a pinhole aperture 14 and onto a conical refracting optic (CRO) 16. CRO 16, for example, may be the above discussed conical refractive crystal or any other optical element that produces a predictable light pattern depending on the polarization of the input electromagnetic radiation. For example, CRO 16 may be a biaxial crystal such as aragonite or monoclinic double tungstate, or other such suitable crystal. In optical system 10, CRO 16 produces a conical refraction pattern 18 (represented by a thick arrow), which is directed through a projecting lens 20 and projected onto an image plane 22. Projecting lens 20 is not always necessary, but may be useful in cases where a clearer image of the conical refraction pattern is desired. Image plane 22 may be, for example, a screen for viewing the conical refraction pattern or an image capture device such as a charged coupled device (CCD), charge injection device (CID), complementary metal oxide semiconductor (CMOS), or any other suitable electronic imaging device configured to capture the conical refraction pattern and perform an analysis of the spatial pattern. For example, input light 12 may be produced by a helium-neon (HeNe) laser and directed through a 300 micron pinhole aperture. Projecting lens 20 may be, for instance, a 25 mm effective focal length (EFL) lens placed adjacent to CRO 16. Image plane 22 may be, for example, simply a wall onto which the conical refraction pattern is projected for viewing.

Figure 3:
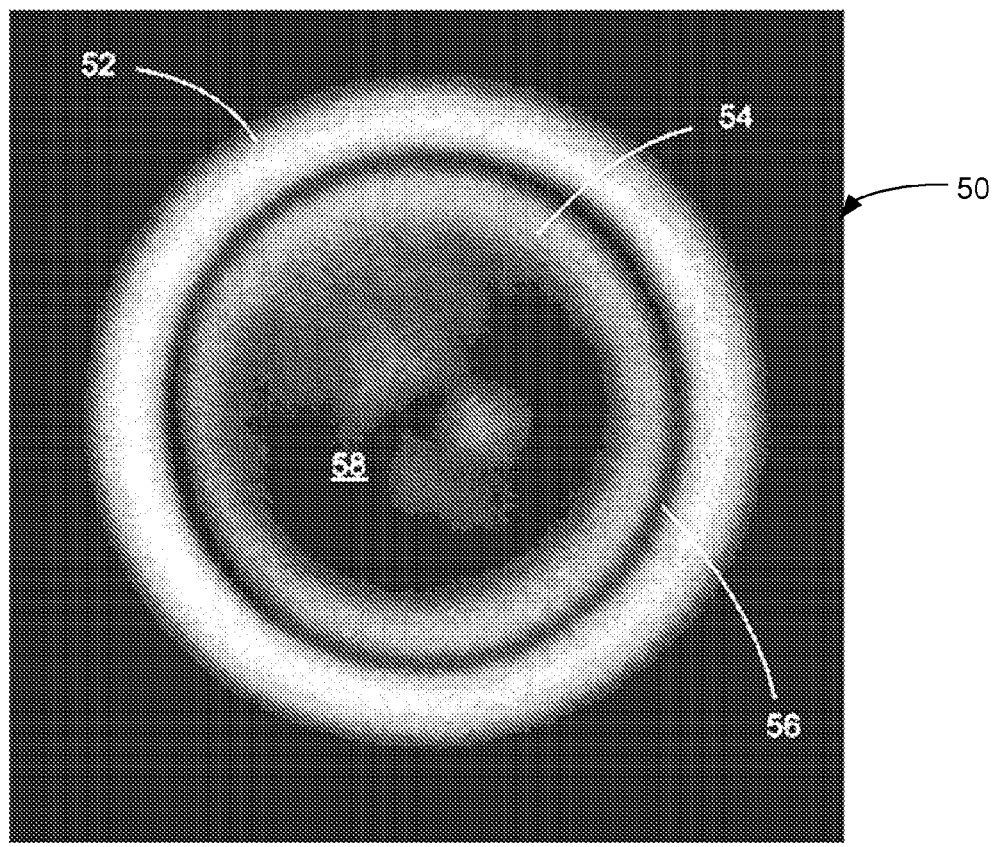
FIG. 3 is a captured image of a typical conical refraction pattern for unpolarized light.

A typical spatial pattern resulting from conical refraction of unpolarized light, as captured at image plane 22 of an optical system like optical system 10 of FIG. 2, is shown in FIG. 3. A conical refraction pattern 50 for unpolarized light includes a bright, outer ring 52 and a bright, inner ring 54, with a dark, null ring 56 separating the two bright rings, and a center portion 58 containing a random distribution of light therein. Such a conical refraction pattern may be viewable at image plane 22 of optical system 10 in FIG. 2, for example, if input light 12 is unpolarized. As may be seen in FIG. 3, the light intensity (or brightness) of outer ring 52 and inner ring 54 are fairly even around the circumferences thereof. That is, each of the bright rings in the conical refraction pattern for unpolarized light has a substantially consistent intensity all around the ring.

Figure 4:
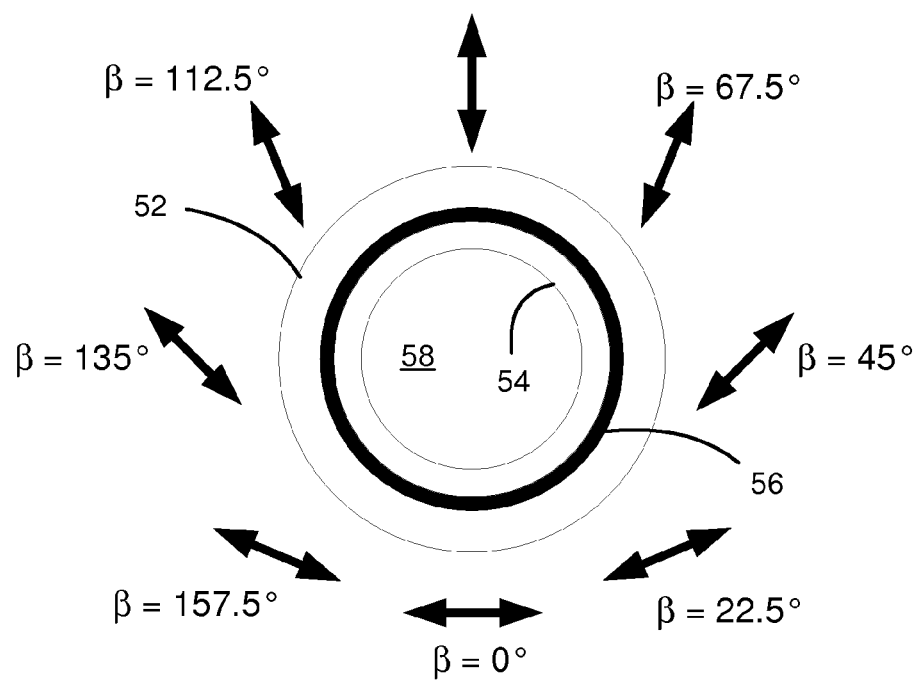
FIG. 4 is a diagram of the spatial distribution of polarization states around the conical refraction pattern.

There exists a distribution of polarization states around the conical refraction pattern as shown in FIG. 4. A plurality of double headed arrows, with angle of reference notations, indicates the rotation of polarization states around the conical refraction pattern. Horizontally polarized light is on the bottom of the circle while vertically polarized light is on the top of the circle. Light polarized at 135 degrees is on the left and light polarized at 45 degrees is on the right. All the linear states are located on this circle. Additionally orthogonal states of polarization are diametrically opposing. In fact the polarization state distribution from conical refraction is essentially the same as the equator on the Poincaré Sphere.

Figure 5:
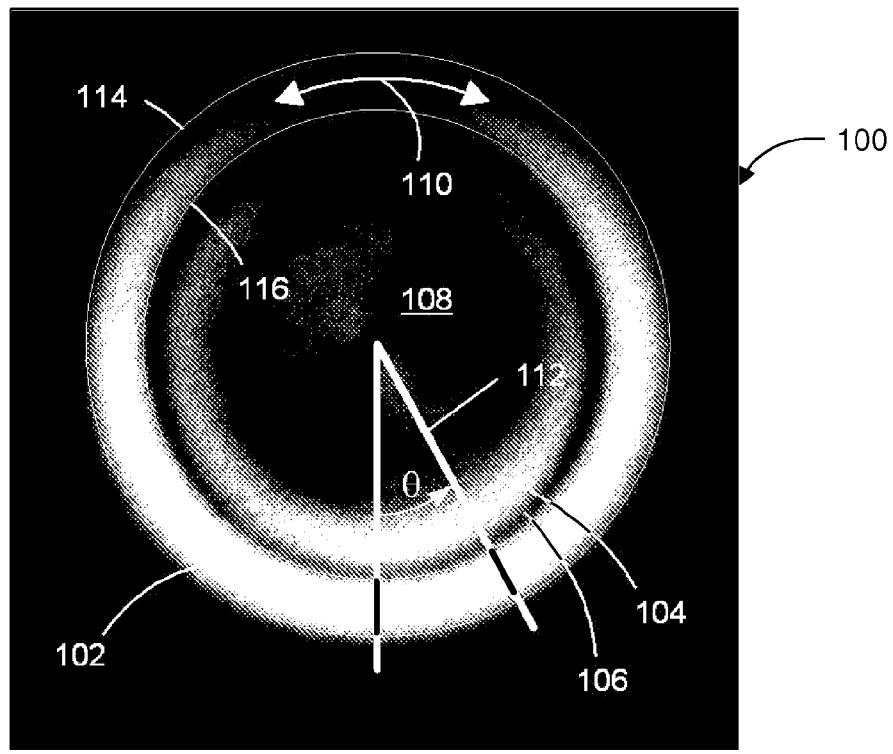
FIG. 5 is a captured image of a conical refraction pattern for horizontally polarized light, shown here to illustrate the presence of a "null" in the ring pattern.
Figure 6:
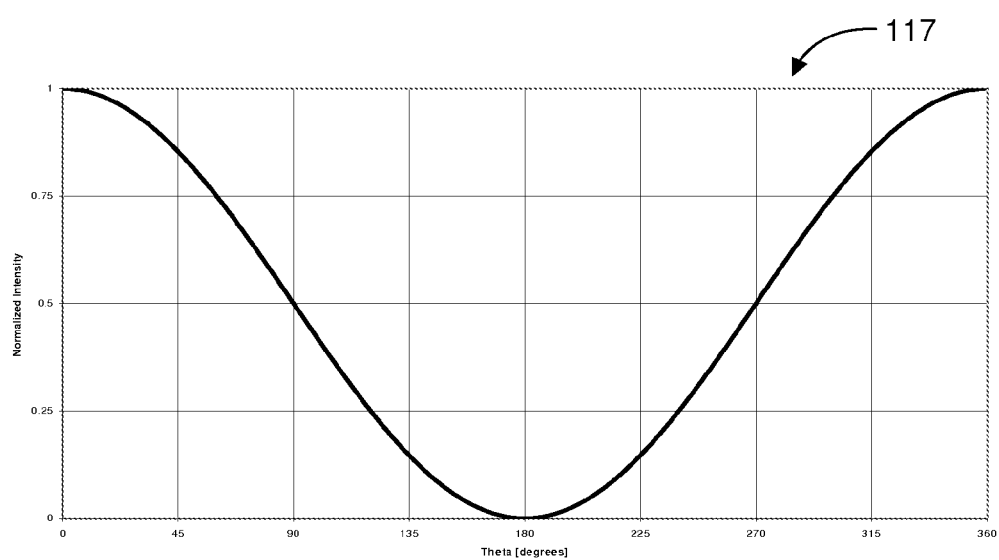
FIG. 6 is a graph showing the intensity profile around the conical refraction pattern for horizontally polarized light.
Figure 7:
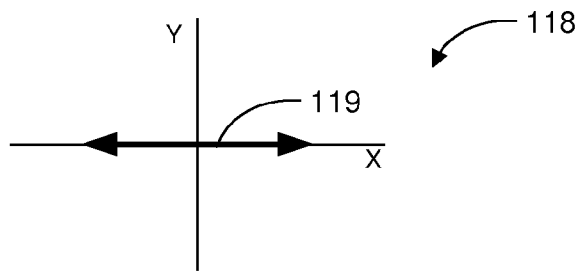
FIG. 7 is a plot of the polarization ellipse of horizontally polarized light.

FIGS. 5-10 illustrate conical refraction patterns for linearly polarized light having different angles of polarization of the input light. FIG. 5 shows a conical refraction pattern 100 produced by a horizontally polarized input light. Like conical refraction pattern 50 for unpolarized light, conical refraction pattern 100 includes a bright, outer ring 102 and a bright, inner ring 104, separated by a dark, null ring 106, as well as a center portion 108, which contains a random distribution of light therein. In contrast to the pattern for unpolarized light, however, conical refraction pattern 100 includes a null region 110 darkening the bottom portion of outer ring 102 and inner ring 104. This position of null region 110 is characteristic for the particular orientation of the polarization of the input light with respect to the CRO. This information may be used to analyze the polarization state of any input light, as discussed immediately hereinafter.

Using the wedge in FIG. 5 describing the angle $\theta$, 112, the intensity is measured at every value of $\theta$ that is bounded by the rings 114 and 116. The measured data is then plotted and shown on FIG. 6 as a plot 117, which is a plot of the measured data in terms of normalized intensity versus the angle $\theta$. This data can be analyzed as follows to determine the angle of rotation and the ellipticity of the incident light. The angle of rotation is determined by simply finding where the angle at the maximum intensity value of the data and dividing this by 2. The ellipticity is determined by taking the square root of the ratio of minimum to the maximum. Curve fits can be used to help find minimums and maximums in noisy data. For the data shown in FIG. 6, the incident light can be inferred to have a rotation angle of 0 degrees and ellipticity of 0, which is indicative of horizontal linear polarization. A plot 118 in FIG. 7 indicates a horizontal linear polarization state 119, which is shown as a horizontal, double-headed arrow, in FIG. 7.

Consider, as an example, an input light having a horizontal, linear polarization state incident on the CRO (as in the polarization state producing the image shown in FIG. 5). The CRO attempts to spread the light in a spatial pattern shown in FIG. 4. However, since the incident beam is linear, it does not contain equal amounts of every linear polarization and thus will create an arc instead of a full circle. The intensity at any point on the circle may be calculated relatively by taking the cosine of the incident polarization state minus β, the angular location on the conical refraction circle, for which you would like to know the intensity, and squaring the result. For this case the relative intensity at β=45 degrees (right side of FIG. 4) would be $\cos^2(0-45°)=0.5$. The relative intensity at β=0 degrees would be $\cos^2(0-0)=1$ and the relative intensity at β=90 degrees would be $\cos^2(0-90°)=0$. Thus the intensity distribution of the spatail pattern when linear polarization is incident on the CRO follows a cosine squared curve as was observed in FIG. 6, where θ=2β.

Figure 8:
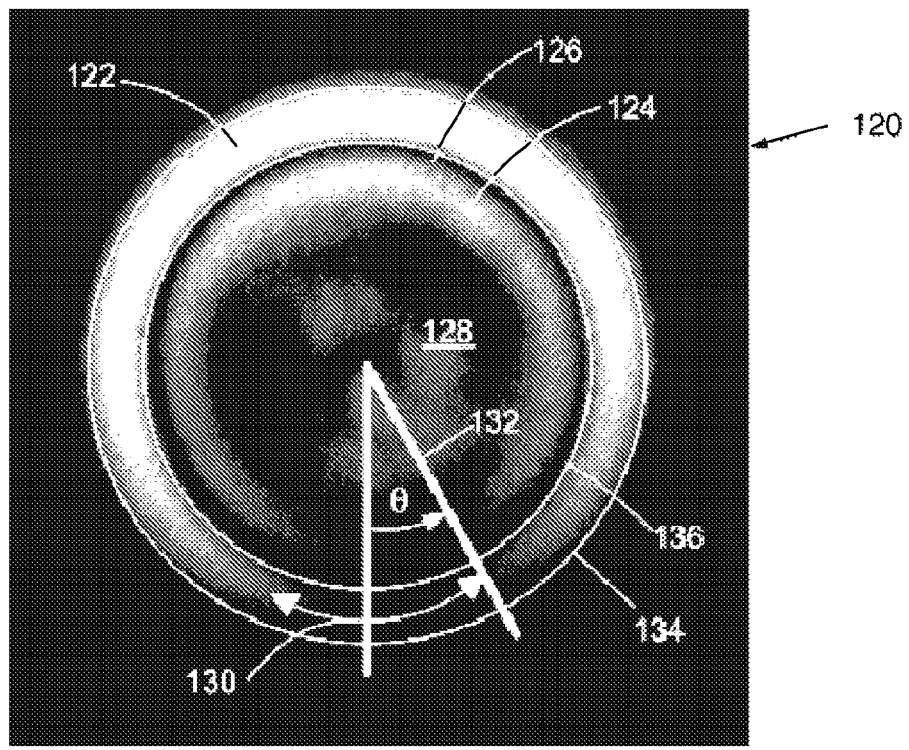
FIG. 8 is a captured image of a typical conical refraction pattern for a linearly polarized light, shown here to illustrate the change in the position of the null in the ring pattern as the linear polarization of the input light is rotated away from the horizontal.

FIG. 8 shows a conical refraction pattern 120 produced by an input light that is linearly polarized, but with the polarization rotated away from the horizontal. Again, conical refraction pattern 120 includes a bright, outer ring 122 and a bright, inner ring 124, separated by a dark, null ring 126. A null region 130 now darkens a bottom right portion of outer ring 122 and inner ring 124, in contrast to the position of the null region in conical refraction pattern 100 of FIG. 5. This shift in the position of the null region indicates a shift in the orientation of the input light polarization state.

Figure 9:
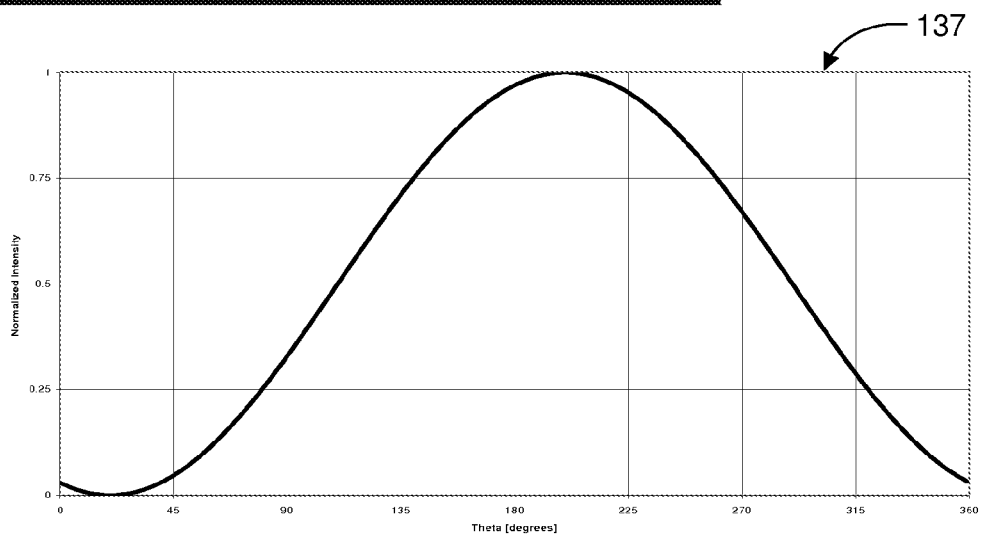
FIG. 9 is a graph showing the intensity profile around the conical refraction pattern for light polarized at 100 degrees of rotation.
Figure 10:
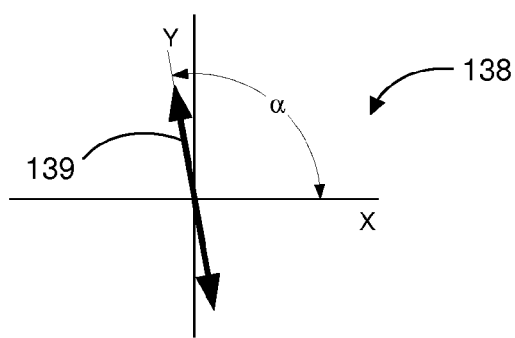
FIG. 10 is a plot of the polarization ellipse of light polarized at 100 degrees of rotation.

FIG. 9 shows a plot 137, which results when wedge 132 in FIG. 8 is swept around the conical refraction pattern and the intensity between boundaries 134 and 136 is measured. Again, plot 137 is a cosine squared curve. However the curve has been shifted along the θ axis, and now has an angle of rotation of 100 degrees and an ellipticity of 0. A plot 138 in FIG. 10 shows a polarization ellipse 139 for the corresponding polarization state.

Figure 11:
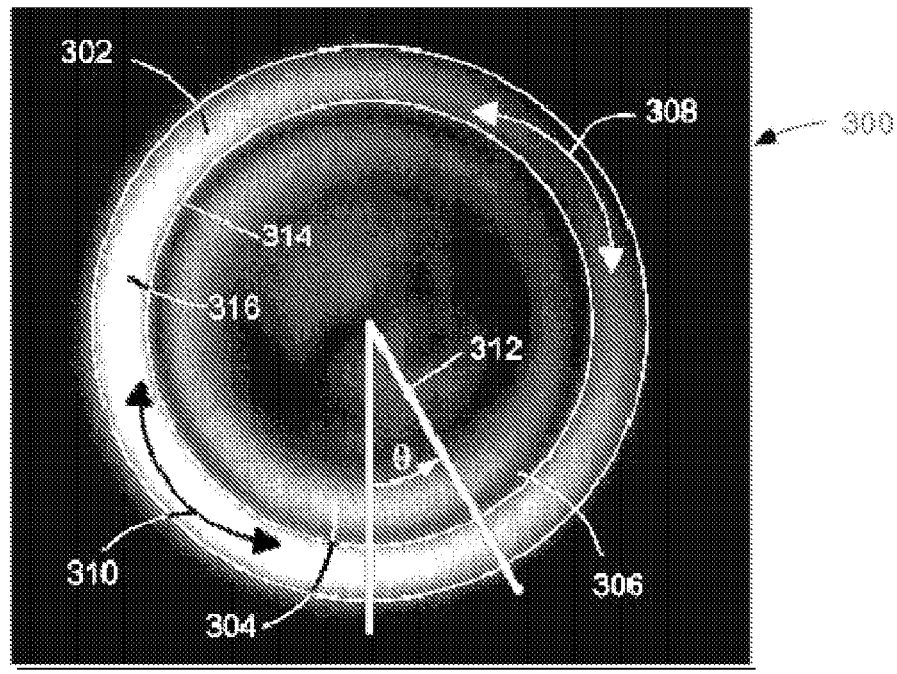
FIG. 11 is a captured image of a conical refraction pattern for elliptically polarized light.

Another conical refraction pattern, this time for an elliptically polarized light, is shown in FIG. 11. FIG. 11 shows a conical refraction pattern 300 including a bright, outer ring 302 and a bright, inner ring 304 separated by a dark, null ring 306. In contrast to the case of linearly polarized input light, conical refraction pattern 300 includes a minimum region 308 instead of a null, this time in the upper right portion of conical refraction pattern 300. Additionally a maximum region 310 is not as bright as a corresponding maximum region in conical refraction pattern 120.

Figure 12:
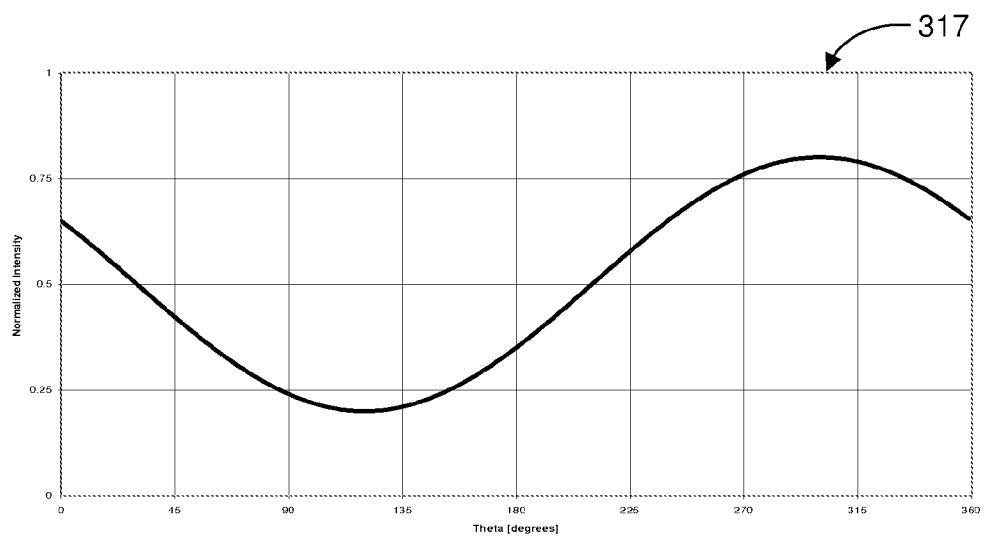
FIG. 12 is a graph showing the intensity profile around the conical refraction pattern for elliptically polarized light.
Figure 13:
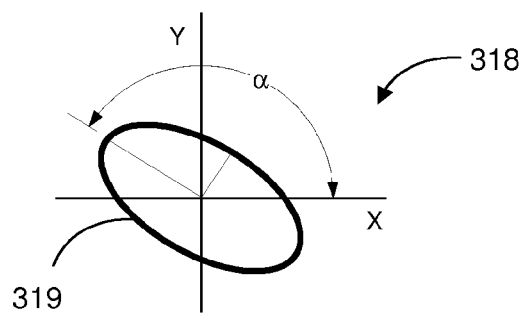
FIG. 13 is a plot of the polarization ellipse of elliptically polarized light.

Again when wedge 312 is swept around the conical refraction pattern in FIG. 11 and intensity is measured between the boundaries 314 and 316, data for intensity as a function of θ is obtained. The resulting data are plotted in a plot 317 in FIG. 12. Of interest is the fact that the minimum intensity is not 0 in plot 317. Therefore, the ellipticity, which is given by the square root of the minimum intensity to the maximum intensity, for this case is sqrt(0.2/0.8)=0.5. The angle of rotation is 150 degrees. A plot 318 in FIG. 13 shows a polarization ellipse 319 for this polarization state.

Figure 14:
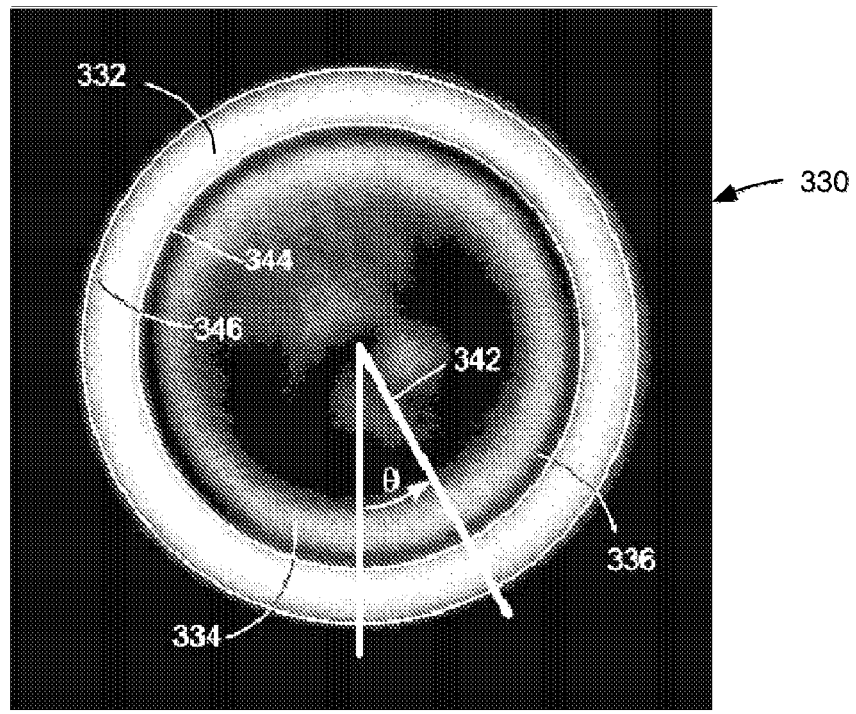
FIG. 14 is a captured image of a conical refraction pattern for circularly polarized light.

Another polarization state to consider is that of circularly polarized light. A captured image of a conical refraction pattern 330 resulting from circularly polarized light is shown in FIG. 14. FIG. 14 shows a bright, outer ring 332 and a bright inner ring 334 separated by a dark, null ring 336. However, this time the intensity around the conical refraction pattern is not a function of θ.

Figure 15:
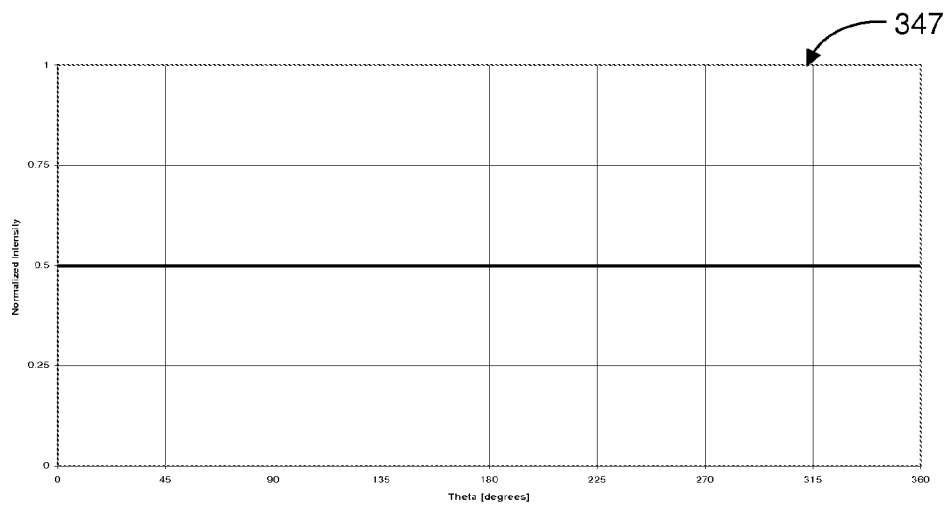
FIG. 15 is a graph showing the intensity profile around the conical refraction pattern for circularly polarized light.
Figure 16:
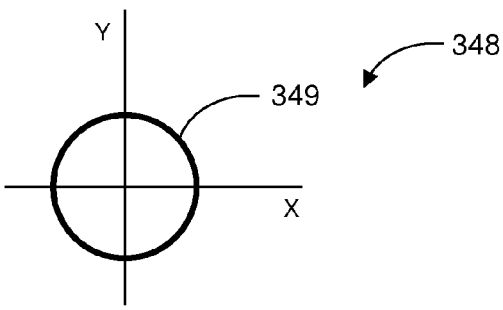
FIG. 16 is a plot of the polarization ellipse of circularly polarized light.

Again, when wedge 342 is swept around the conical refraction pattern in FIG. 14 and intensity is measured between the boundaries 344 and 346, data for intensity as a function of θ is obtained. The resulting data are plotted in a plot 347 in FIG. 15. It is again noted that the intensity of the outer bright ring in the conical refraction pattern does not change with θ. This characteristic indicates an ellipticity of unity with an undefined angle of rotation, meaning that the light is circularly polarized. A plot 348 in FIG. 16 shows a polarization ellipse 349 for this polarization state.

Figure 17:
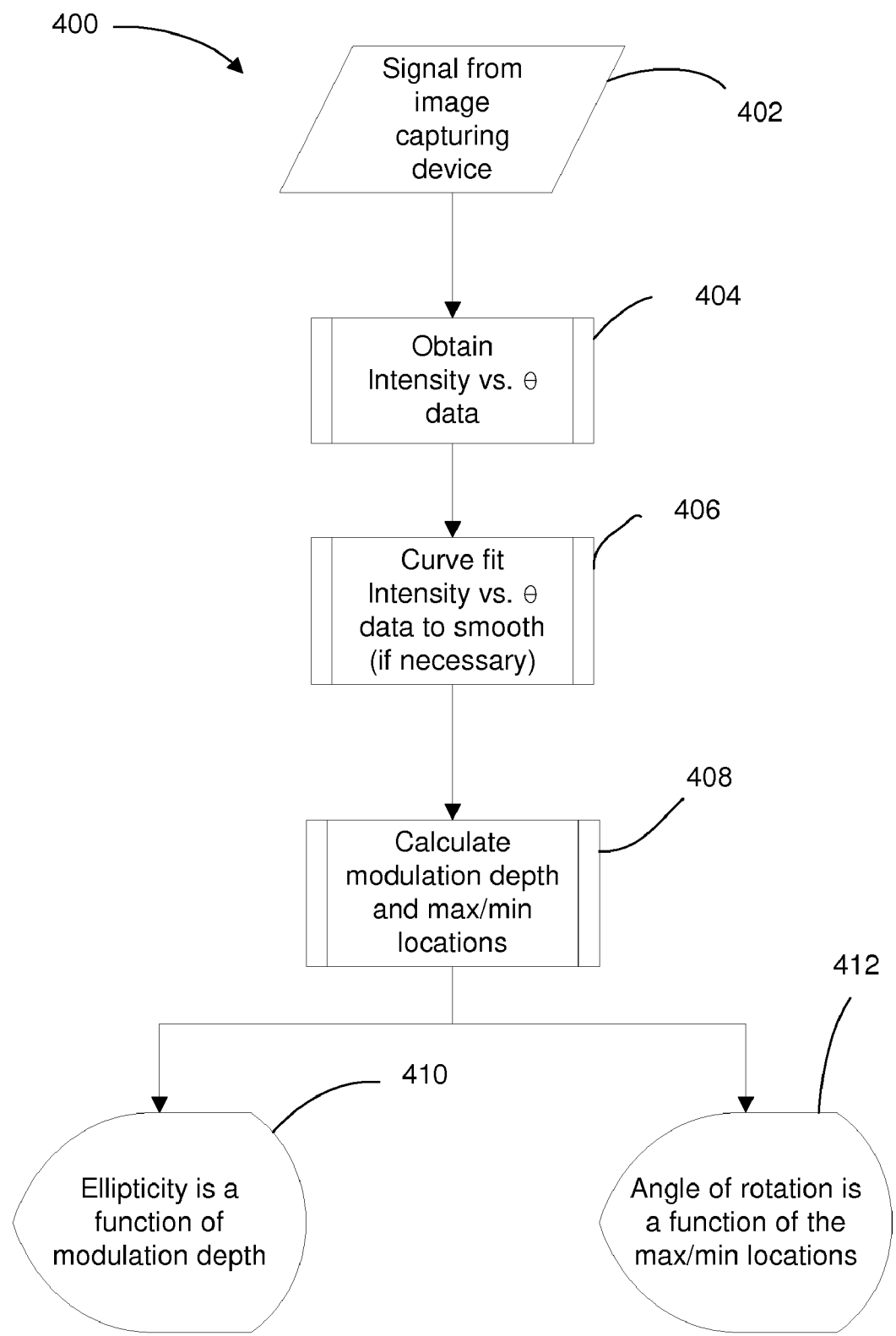
FIG. 17 is a hybrid flow diagram illustrating an algorithm for calculating the polarization state of incident light in accordance with the present disclosure.

Referring to FIG. 17 in conjunction with FIG. 2, an algorithm 400 for extracting information regarding the polarization state of the input light is illustrated. Algorithm 400 begins with input data 402 corresponding to signal from an image capture device located at image plane 22 of optical system 10. The signal at the image capture device would be, for example, light intensity data of a given conical refraction pattern, such as those shown in FIGS. 5, 8, 11, and 14. Input data 402 are interpreted in a step 404 to obtain intensity versus angular position data, such as the plots shown in FIGS. 6, 9, 12, and 15. In a step 406, the intensity versus angular position plot is curve fitted and smoothed, if necessary. The curve fit information is used in a step 408 to calculate the minimum to maximum intensity ratio as well as the angular locations of the maximum and minimum intensities. The intensity ratio information is then used to calculate ellipticity of the input polarization in step 410, and the information regarding the angular locations of the maximum and minimum intensities is used to determine the angle of rotation of the input light polarization state, which is a function of the angular locations of the maximum and minimum intensities.

Figure 18:
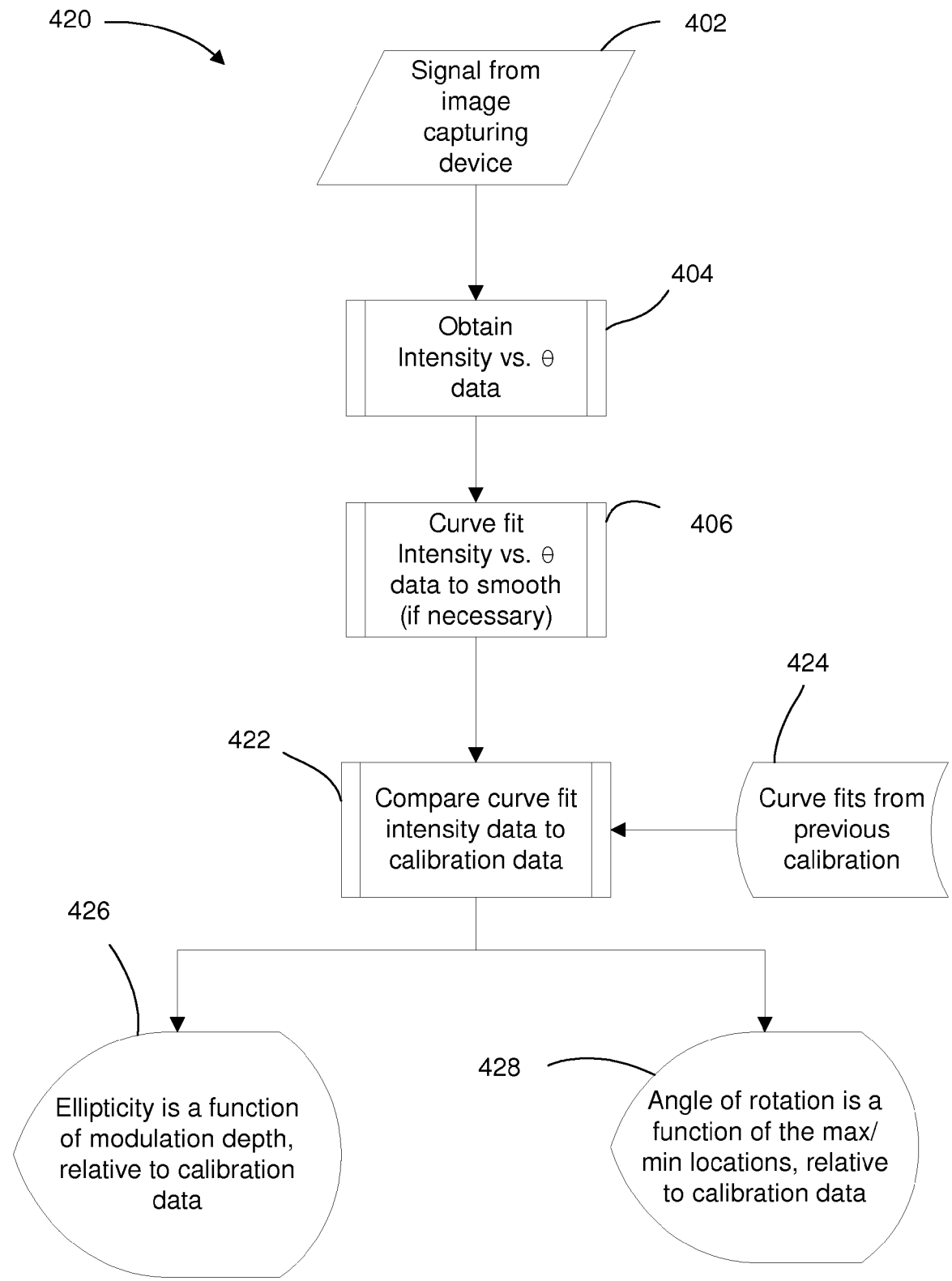
FIG. 18 is a flow diagram illustrating a modified algorithm for calculating the polarization state of incident light in accordance with the present disclosure.

FIG. 18 illustrates a modified algorithm 420 for again extracting information regarding the polarization state of the input light but this time with calibration. Following step 406 to curve fit the intensity versus angular position data, modified algorithm 420 now includes a step 422 to compare the curve fit of the intensity versus angular position data to calibration data 424, which includes curve fit information from previous calibration processes. The calibration process requires at least three calibration curves of quasi-orthogonal polarization states, for example horizontal linear, 45° linear, and circular. Using standard linear algebra curve fitting techniques, the measured intensity vs. θ curves may be resolved into components of the calibration curves. The advantage of this technique is that the basis set for the measured polarization states can be user defined. This allows the user to "calibrate-out" systematic errors, which result from poor alignment of the optics, detector non-linearities, and many other defects and errors. The data from this technique resemble the Stokes parameters, S1, S2, and S3. The ellipticity of the input light polarization, as a function of S1, S2, and S3 is determined in a step 426. Similarly, the angle of rotation as a function of S1 and S2, is determined in a step 428.

Figure 19:
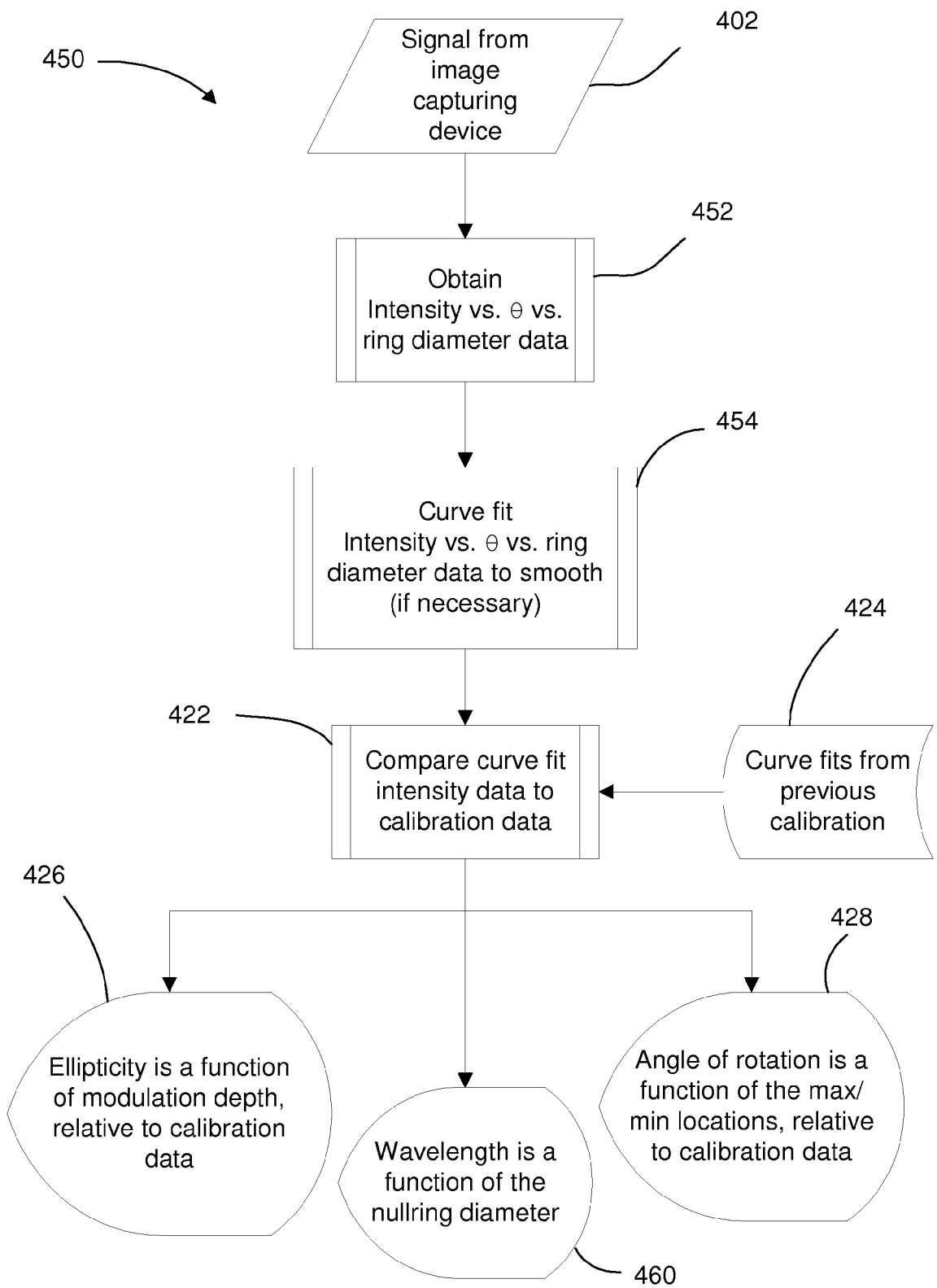
FIG. 19 is a flow diagram illustrating yet another algorithm for calculating the polarization state of incident light, including calibration, in accordance with the present disclosure.

FIG. 19 shows still another algorithm for obtaining information regarding the polarization state of the input light using the optical system shown in FIG. 2. Another algorithm 450 now includes a step 452 to obtain intensity versus angular position θ versus bright ring diameter data. The data thus obtained are curve fitted and smoothed, if necessary, in a step 454. As in modified algorithm 420 of FIG. 18, the curve fit of the intensity data is compared to curve fits from previous calibration processes in step 424. This time, in addition to deducing ellipticity and angle of rotation in steps 426 and 428, respectively, the wavelength of the input light may be determined in a step 460 as a function of the bright ring diameter.

Other optical system configurations, in addition to that shown in FIG. 2, may also function as a polarimeter based on a CRO, in accordance with the present disclosure. FIGS. 20-27 illustrate some examples of such alternative configurations, as will be described in detail immediately hereinafter.

Figure 20:
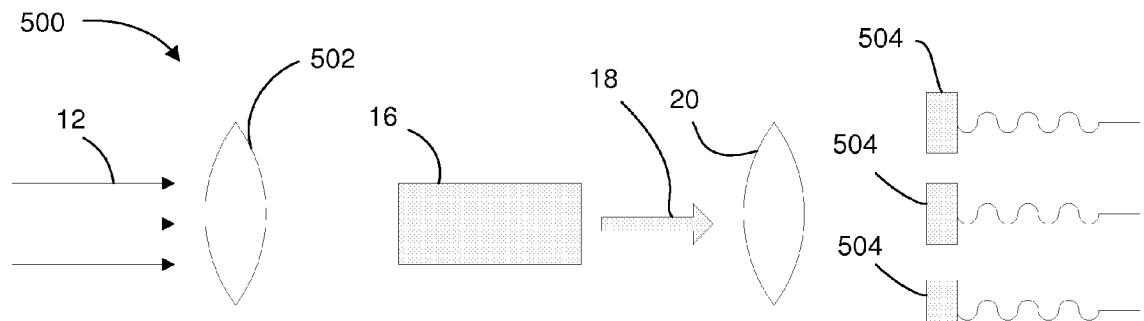
FIGS. 20-22 are diagrammatic illustrations showing examples of conical refraction polarimeters with different light input and image viewing configurations, in accordance with the present disclosure.

FIG. 20 is a diagrammatic illustration of an optical system suitable for use as a polarimeter without the use of an image capture device, such as a CCD. That is, data are obtained, which are representative of only a selected portion of the light pattern. Referring to FIG. 20 in conjunction with FIG. 2, an optical system 500 includes a focusing lens 502 in place of pinhole aperture 14. Also, a plurality (three or more) of detectors 504 are disposed at the location of image plane 22 so as to capture intensity data around the circumference of conical refraction pattern 18. The intensity data, combined with a priori knowledge of the angular position of the detectors, may be used to determine information regarding the polarization state of input light 12. That is, it is not necessary to capture an image of conical refraction pattern 18 in its entirety for the polarization analysis. In fact, by capturing intensity data at just three or more points around the conical refraction pattern, information regarding the polarization state of the input light, including ellipticity and angle of rotation, may be obtained, thereby providing for a low cost implementation with inexpensive detectors, without requiring expensive image capture devices such as CCDs.

Figure 21:
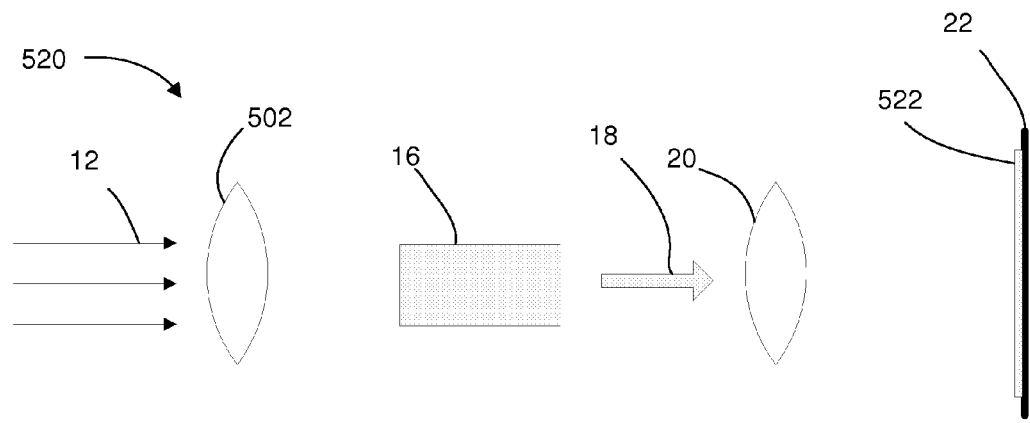

As a variation, using a conical refractive crystal, it is possible to instantaneously spread a pulsed radiation input into a spatial pattern (i.e., conical refraction pattern) whose details depend on the polarization state of the radiation input. For example, adding a coating of a material providing phosphorescence to either the output facet of the biaxial crystal or the image capture device allows even slow, off-the-shelf CCD and CMOS sensors to measure the polarization state of extremely short pulse lasers. The present approach is additionally advantageous because such a polarimeter is capable of detecting ultraviolet radiation that may be outside of a normal detector sensitivity range. The use of a material providing phosphorescence is further advantageous because the damage threshold is increased over an uncoated image capture device while polarization-dependent effects in the image capture device are reduced. Such an embodiment compatible with pulsed radiation is shown in FIG. 21. FIG. 21 is a diagrammatic illustration of another polarimeter setup including a CRO and compatible with an image capture device. Referring to FIG. 21 in conjunction with FIG. 2, an optical system 520 still includes image plane 22, at which a screen or an image capture device may be positioned, and pinhole aperture 14 has been replaced with focusing lens 502. Additionally, a phosphorescent coating 522 has been added before image plane 22 such that the very brief, conical refraction pattern produced by the short pulse laser causes the phosphorescent coating to fluoresce in accordance with the conical refraction pattern, which may be captured by a slower, image capture device or detector.

Figure 22:
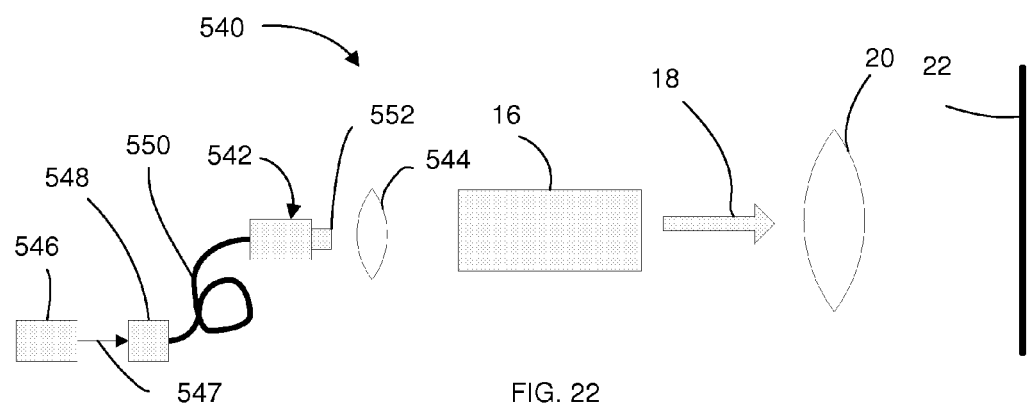

FIG. 22 is a diagrammatic illustration of still another polarimeter setup, in which an optical system 540 includes an optical fiber light output 542 and a correspondingly small, focusing lens 544. For example, optical fiber light output 542 may be connected with a laser light source 546, such as a helium-neon (HeNe) laser, producing a laser light 547 coupled into optical fiber light output 542 by a coupling lens 548. Alternatively, a white light source may be used in place of laser light source 546. Coupling lens 548 directs laser light 547 through an optical fiber 550 and out of optical fiber light output 542 via, for example, a ferrule 552. Optical fiber 550 may be, for example, a single mode fiber. Laser light emanating from ferrule 552 is then focused through focusing lens 544, which may be, for instance, a graded index (GRIN) collimating lens. A suitable lens for use as projecting lens 20 in this case may be, for example, a 25 mm effective focal length (EFL) lens attached directly to an end of CRO 16.

FIGS. 23-26 illustrate exemplary configurations of polarimeters including a CRO and additional components for determining the handedness of the polarization state of the input light. Although the embodiments shown in FIGS. 23-26 are shown as modifications to the optical system shown in FIG. 21, it is noted that similar modifications may be made in the alternative polarimeter setups as shown in, for example, FIGS. 2, 20 and 22 and achieve the same effects.

For purposes of determination of the handedness of the input light polarization state, for example, between light having a left-handed polarization state and light having a right-handed polarization state, a portion of the input light may be diverted using, for instance, a beam splitter toward a suitable set of optical elements for determining polarization handedness. These approaches are dependent on separating the portion of the input light into right- and left-handed polarization components and detecting these components separately such that the ratio of the detected intensities identify the handedness of the light. The component used to divert the portion of the input light (e.g., a non-polarizing beam splitter) should be configured to pick off only a small amount of light as necessary for the handedness determination so as to not negatively affect the signal-to-noise ratio of the conical refraction pattern. Any polarization dependent loss (PDL) associated with the beam splitter may be removed from the conical refraction pattern analysis by appropriate calibration.

Figure 23:
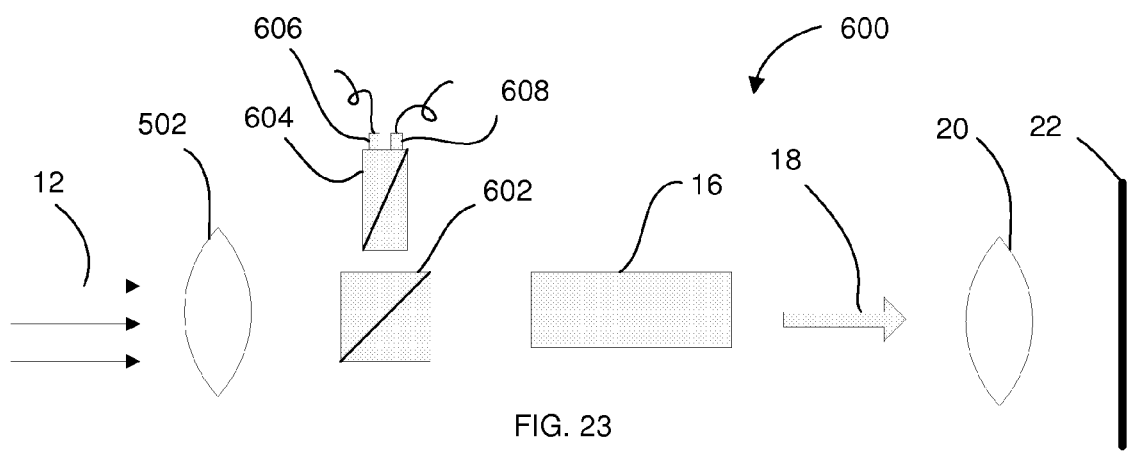
FIGS. 23-26 are diagrammatic illustrations showing examples of different polarimeter configurations to determine the handedness of the polarization state of the incident light, in accordance with the present disclosure.

FIG. 23 shows an optical system 600 including a non-polarizing beam splitter (NPBS) 602 inserted between focusing lens 502 and CRO 16. NPBS 602 directs a portion of input light 12 towards a Fresnel prism 604. First and second detectors 606 and 608, respectively, are positioned adjacent to Fresnel prism 604 such that the ratio of intensity captured by first and second detectors may be used to calculate the handedness of the input light polarization state. This approach has the advantage that the Fresnel prism is achromatic such that the wavelength of the input light does not affect the handedness determination process.

Figure 24:
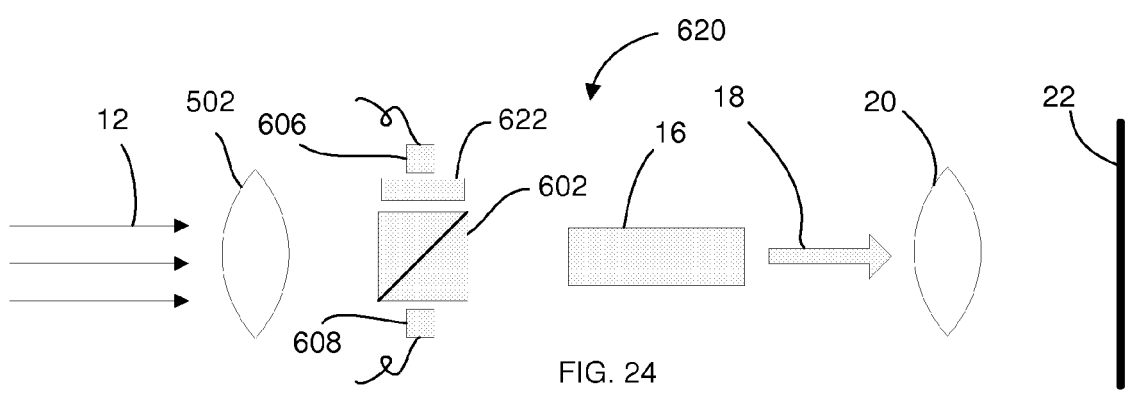

FIG. 24 shows an optical system 620, in which first and second detectors 606 and 608 are disposed on opposite sides of NPBS 602 and further including a reflective circular polarizer 622 in between NPBS 602 and first detector 606. Again, the ratio of intensity captured by first and second detectors is used to calculate the handedness of the input light. For instance, if the light intensity received at first detector 606 is high with respect to that at second detector 608, then it may be determined that the input light has the same handedness as that of the circular polarizer. A reflective circular polarizer suitable for use in such a configuration is commercially available, for example, from Chelix Technologies Corporation.

Figure 25:
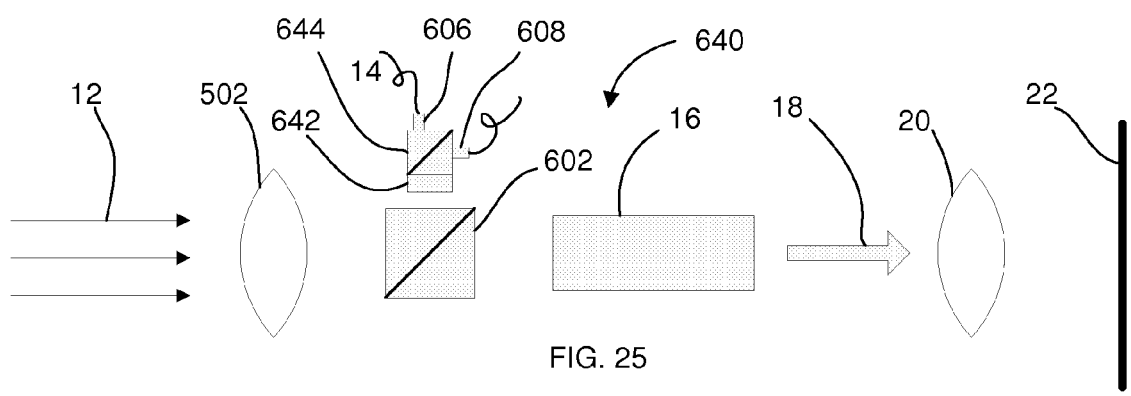

Another optical system 640 in FIG. 25 includes a quarter-wave retarder 642 and a polarizing beam splitter (PBS) 644, with first and second detectors 606 and 608 positioned on two different sides of PBS 644. In this way, first and second detectors 606 and 608 are configured to detect different polarization components within input light 12, thereby yielding information regarding the handedness of the polarization state.

Figure 26:
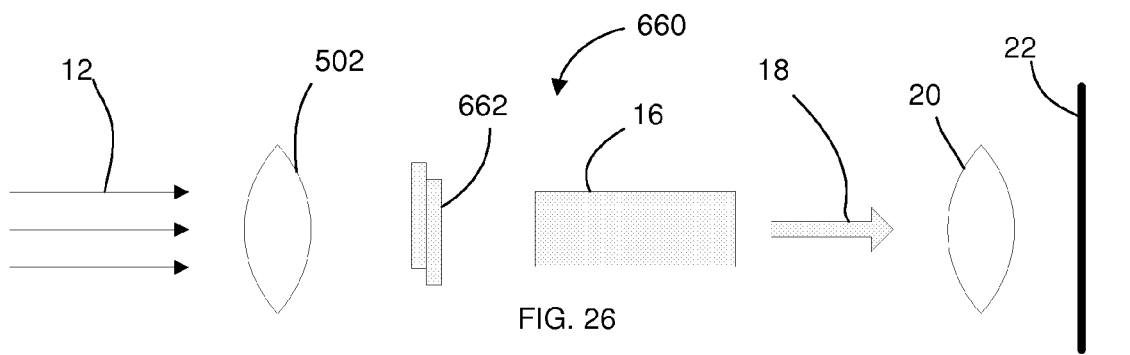

Still another configuration shown in FIG. 26 is an optical system 660 including a tunable retarder 662 disposed between focusing lens 502 and CRO 16. Tuning the retardance of tunable retarder 662 results in changes in conical refraction pattern 18 correlating to the handedness of the input light polarization state.

Referring again to FIGS. 2 and 21, assuming input light 12 is non-monochromatic, the wavelengths present in the input light may be determined in a number of different ways. For example, in the case of optical system 10 as shown in FIG. 2, pinhole aperture 14 creates an Airy pattern in addition to the conical refractive pattern such that the Airy pattern may be analyzed to determine the incoming spectrum while the conical refractive pattern may be analyzed to determine the polarization state of the input light. In another embodiment, using optical system 520 as shown in FIG. 21, projecting lens 20 may be configured to exhibit high chromatic dispersion such that it separates the conical refractive pattern in accordance with the different wavelengths present in the input light. In this way, each wavelength (or color) present in the input light spectrum may be determined along with the polarization state.

Figure 27:
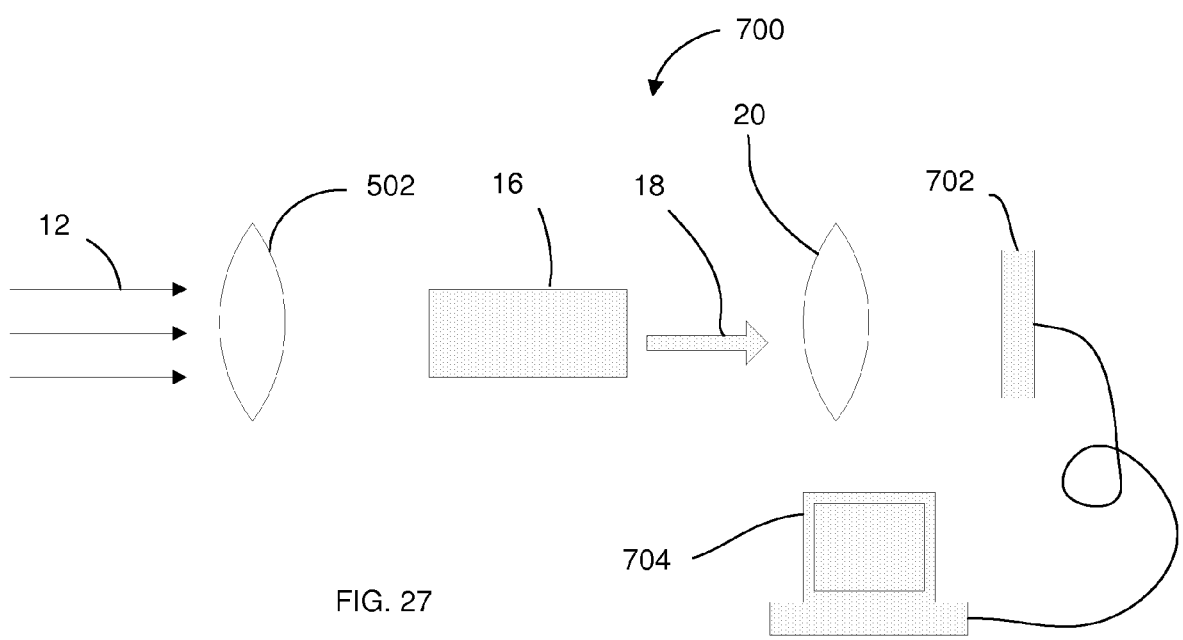
FIG. 27 is a diagrammatic illustration of a polarimeter including analysis of conical refraction patterns, in accordance with the present disclosure.

Turning now to FIG. 27, a polarimeter configuration including a computer analysis system is illustrated. A polarimeter 700 includes components of optical system 520, as shown in FIG. 21, for producing a conical refraction pattern 18. Projecting lens 20 is configured to image conical refraction pattern onto an image capture device 702, which then directs the captured image data onto a computer 704. Computer 704 includes software for analyzing the captured image data in accordance with, for example, one of the above discussed algorithms so as to extract information regarding the polarization state and/or wavelength of the input light. In other words, the combination of image capture device 702 and computer 704 acts as an image analysis arrangement for receiving the conical refraction pattern and performing an analysis of the received pattern so as to determine the polarization state of input light 12.

The polarimeter of the present disclosure provides at least three advantageous features: (1) the speed of analysis is limited mainly by the speed of the image capture device; (2) the polarization arc in the conical refraction pattern is achromatic such that multiple wavelengths may be deconvolved, for example, if the image capture device is capable of handling a plurality of wavelengths; and (3) no modulation of polarimeter components is required such that the analysis essentially involves image analysis.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A polarimeter for receiving an input electromagnetic radiation characterized by a polarization state and for determining said polarization state, said polarimeter comprising:
   a refractive arrangement configured for conically refracting said input electromagnetic radiation so as to provide a spatial pattern corresponding to said polarization state; and
   an image analysis arrangement configured for receiving said spatial pattern, producing an electronic image of the spatial pattern, and for determining the polarization state of the input electromagnetic radiation according to the electronic image of the spatial pattern.

2. The polarimeter of claim 1 wherein said refractive arrangement is a biaxial crystal.

3. The polarimeter of claim 2 wherein said biaxial crystal is a conical refractive crystal.

4. The polarimeter of claim 3 wherein said conical refractive crystal is aragonite.

5. The polarimeter of claim 3 wherein said conical refractive crystal is monoclinic double tungstate.

6. The polarimeter of claim 1 wherein the spatial pattern exhibits a two-dimensional spatial variation based on the polarization state, and said image analysis arrangement includes an image capture arrangement configured for capturing said two-dimensional spatial variation of said spatial pattern.

7. The polarimeter of claim 6 wherein said image capture arrangement includes a CCD sensor.

8. The polarimeter of claim 6 wherein said image capture arrangement includes a CID sensor.

9. The polarimeter of claim 6 wherein said image capture arrangement includes a CMOS sensor.

10. The polarimeter of claim 6 wherein the two-dimensional spatial variation is a conical refraction pattern exhibiting at least one arc, and said arc circumscribes an angular range that depends at least in part on said polarization state.

11. The polarimeter of claim 10 wherein said arc exhibits an angular variation over at least a portion of said angular range, and said angular variation depends at least in part on said polarization state.

12. The polarimeter of claim 1 further comprising an optical arrangement for directing said input electromagnetic radiation into said refractive arrangement.

13. The polarimeter of claim 1 wherein said input electromagnetic radiation is a radiation pulse, wherein said refractive arrangement is configured to be responsive to said radiation pulse so as to produce said spatial pattern in response to said radiation pulse, and wherein said image analysis arrangement is further configured for determining said polarization state of said radiation pulse according to said spatial pattern.

14. The polarimeter of claim 13 wherein said image analysis arrangement includes a material having phosphorescence.

15. The polarimeter of claim 14 wherein said material having phosphorescence is a phosphor.

16. The polarimeter of claim 1 wherein said input electromagnetic radiation is a continuous source of ultraviolet light, and wherein said polarimeter further includes a material having phosphorescence for converting said ultraviolet light into visible light.

17. The polarimeter of claim 1 wherein said input electromagnetic radiation is a continuous source of ultraviolet light, and wherein said polarimeter further includes a material having fluorescence for converting said ultraviolet light into visible light.

18. The polarimeter of claim 1 wherein the refractive arrangement and the image analysis arrangement are configured to cooperate with one another to define no more than one optical path that extends through the refractive arrangement, and the optical path is at least generally aligned with said input electromagnetic radiation such that said refractive arrangement receives said input electromagnetic radiation and directs said electromagnetic radiation along said optical path, through said refractive arrangement, to said image analysis arrangement.

19. The polarimeter of claim 1 further comprising an optical arrangement for directing said spatial pattern to said image analysis arrangement.

20. In a polarimeter for receiving input electromagnetic radiation characterized by a polarization state and for determining said polarization state, a method comprising:

conically refracting said input electromagnetic radiation so as to provide a spatial pattern corresponding to said polarization state; and electronically analyzing said spatial pattern to determine said polarization state.

21. The method of claim 20 wherein said conical refracting includes directing said input electromagnetic radiation through a biaxial crystal.

* * * * *